Figure 2B:
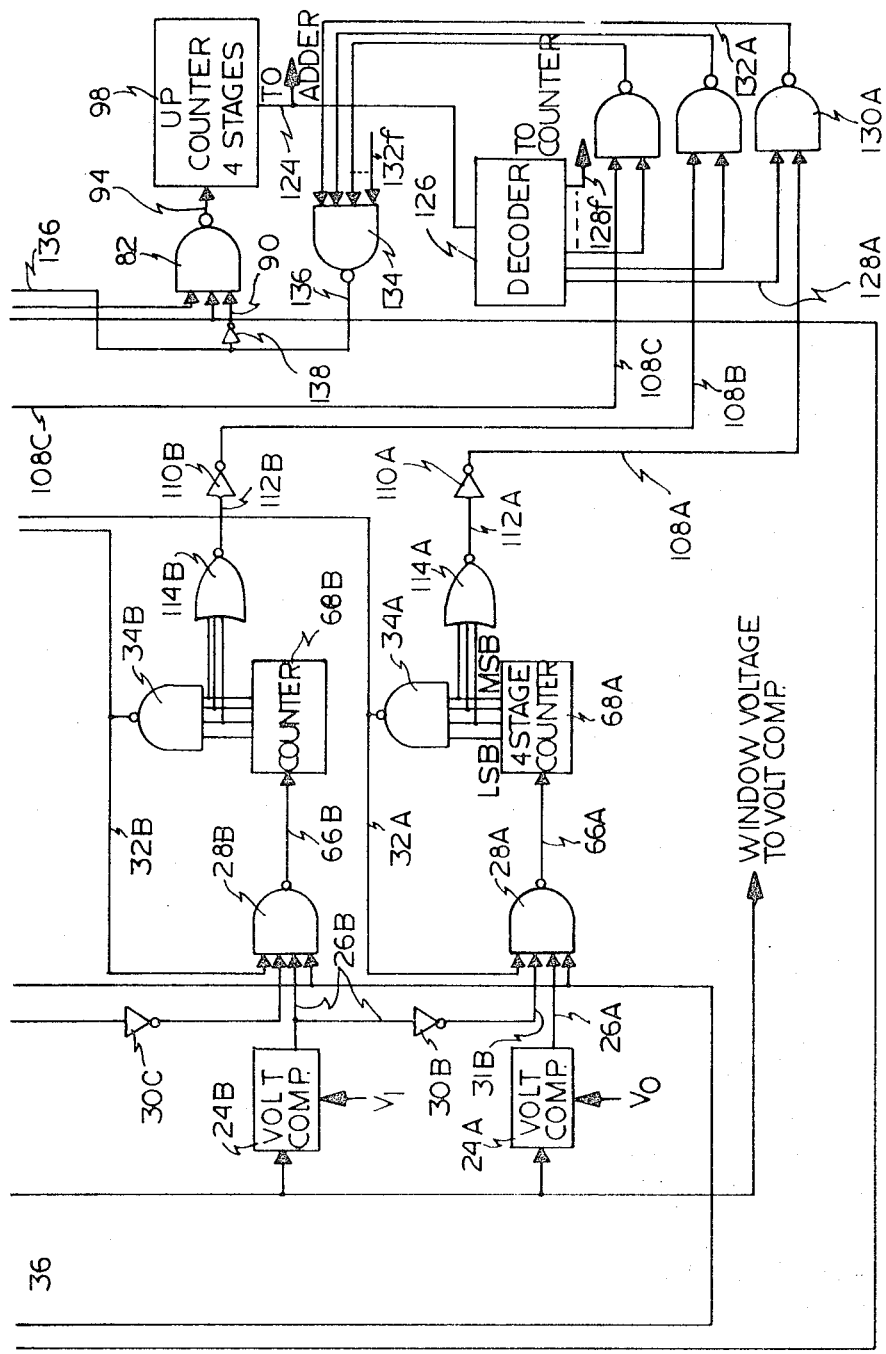

United States Patent
Hall et al.

[15] 3,665,512
[45] May 23, 1972

[54] METHOD AND APPARATUS FOR DETECTING THE FREQUENCY OF A REPETITIVE PULSE SIGNAL

[72] Inventors: Stanley Rylon Hall, Ellicott City; Thomas Gilbert Nichols, Silver Spring, both of Md.

[73] Assignee: The Bunker-Ramo Corporation, Oak Brook, Ill.

[22] Filed: June 1, 1970

[21] Appl. No.: 42,355

[52] U.S. Cl. .................................................343/18 E, 324/77 B
[51] Int. Cl. .........................................................G01r 23/02
[58] Field of Search..............343/18 E, 18 R; 324/77 B, 77 C

[56] References Cited

UNITED STATES PATENTS 3,160,883   12/1964   Buyer et al. ..........................343/18 E Primary Examiner—Richard A. Farley
Assistant Examiner—G. E. Montone
Attorney—Frederick M. Arbuckle

[57] ABSTRACT

A method and apparatus for detecting the frequency of a repetitive pulse signal with greater selectivity than that of the sensor equipment utilized. The sensor is swept through a selected frequency band and a histogram generated of the frequency distribution of pulses detected by the sensor during the sweep. When the forming of the histogram is complete, an indication is generated of the upper and lower frequency in the selected frequency band in which a number of pulses exceeding a predetermined threshold were detected. The upper and lower frequency indications are then utilized to determine the desired frequency.

29 Claims, 8 Drawing Figures

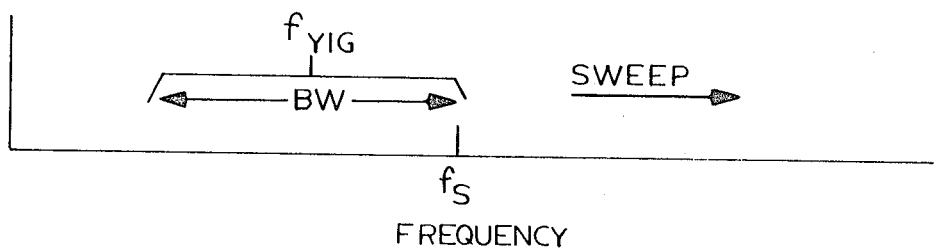
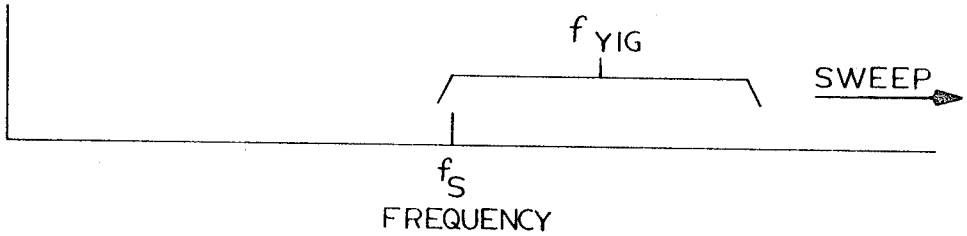
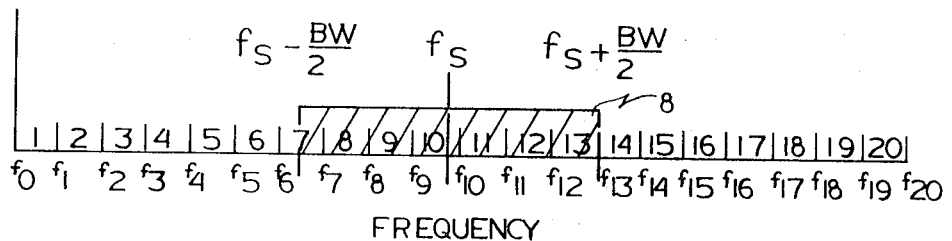

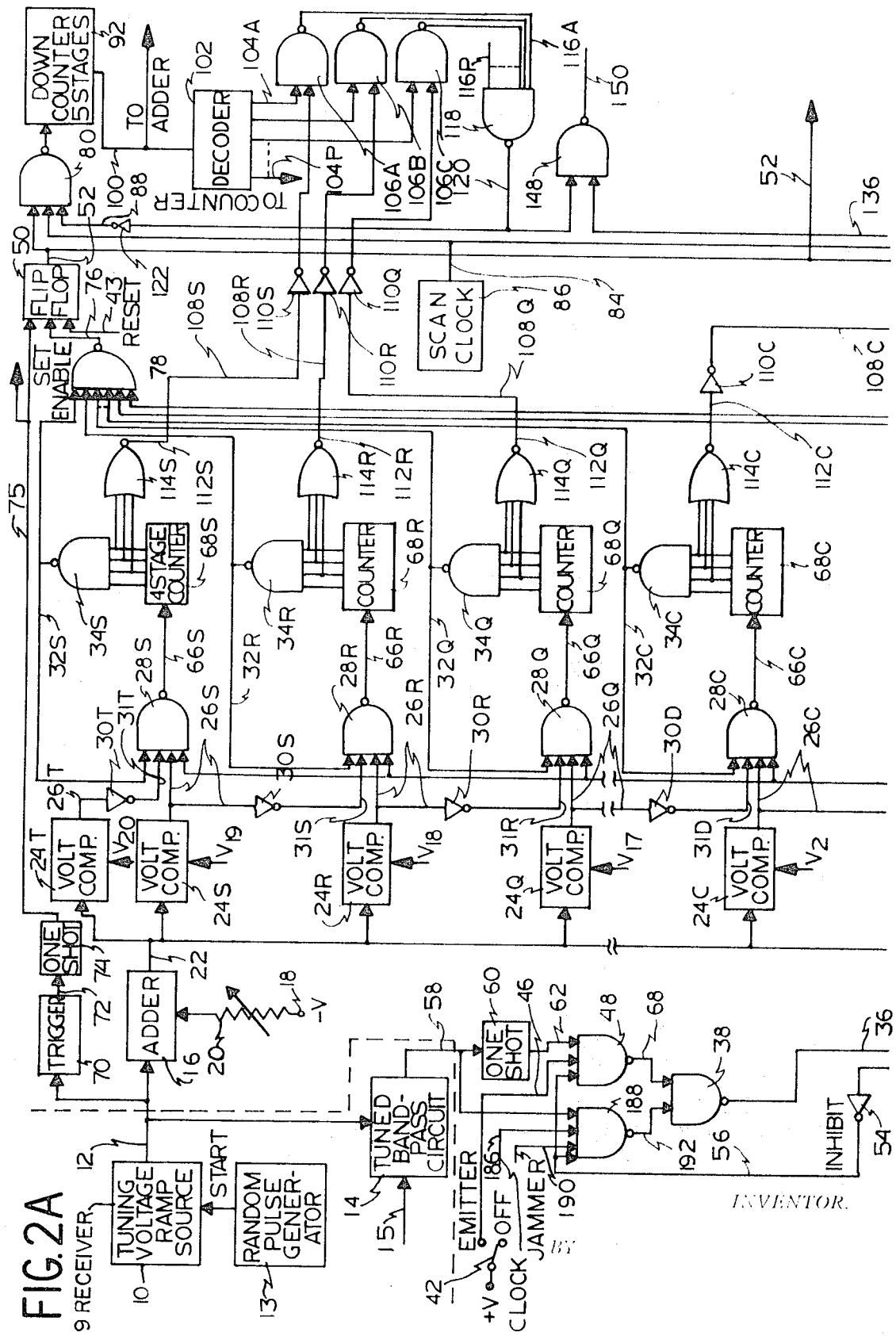

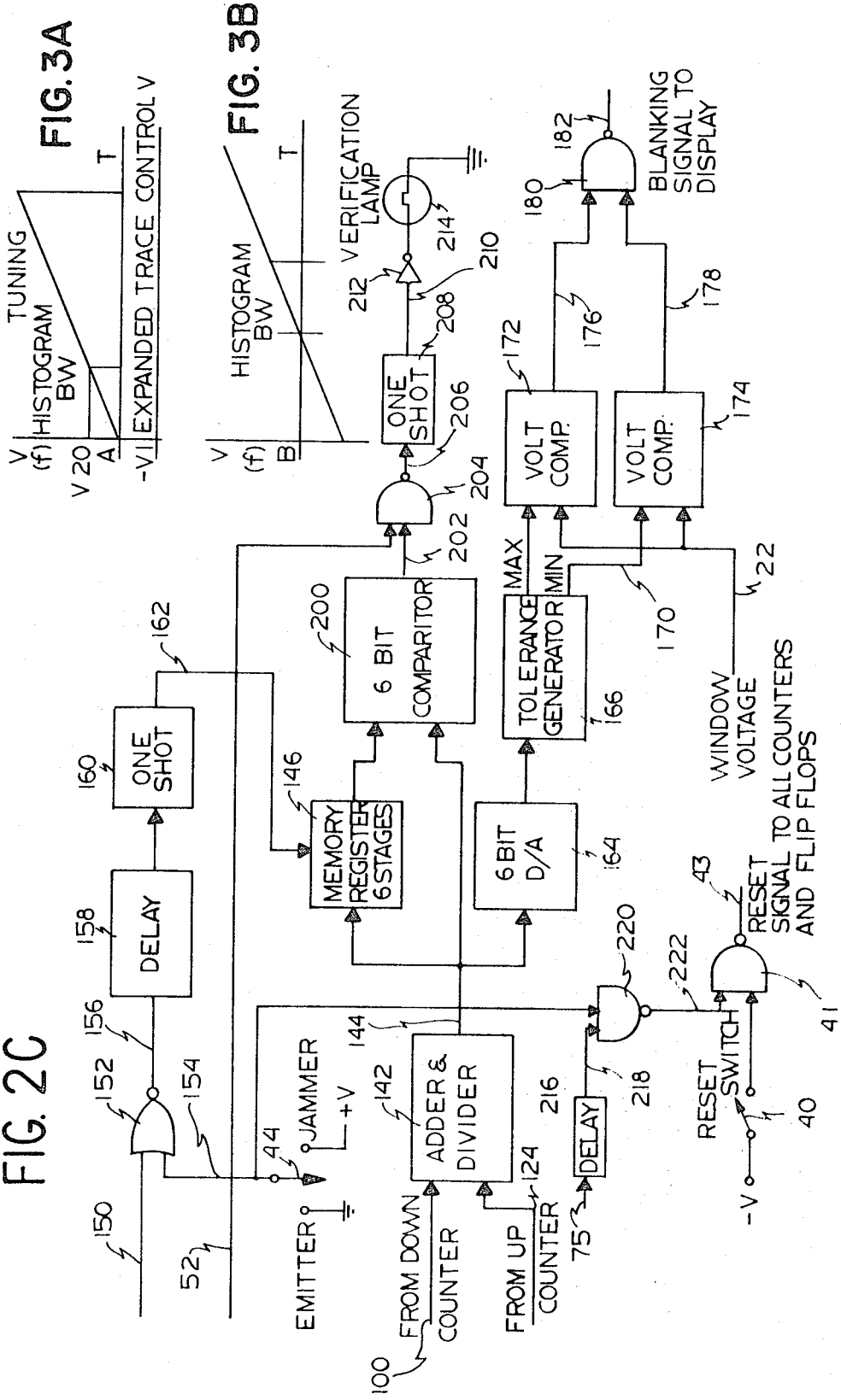

METHOD AND APPARATUS FOR DETECTING THE FREQUENCY OF A REPETITIVE PULSE SIGNAL

This invention relates to a method and apparatus for detecting the frequency of a repetitive pulse signal with greater selectivity than that of the sensing equipment utilized.

There are numerous applications, particularly in electronic warfare, where a requirement exists to determine the carrier or RF frequency of a repetitive pulse signal. Such a signal may, for example, originate from an unfriendly radar source and a requirement may exist to generate a jamming signal at the detected frequency.

In all presently known systems the degree of accuracy with which the detected frequency can be characterized is limited by the selectivity of the receiver and sensor utilized. High accuracy in devices of this type can presently be achieved only by use of extremely complicated and expensive equipment. A need therefore exists for a relatively simple and inexpensive technique for permitting the frequency characterization of the detected signal to be made with greater selectivity than that of the equipment utilized. Such a technique should not depend on the received signal being periodic with the observation period of the sensor and should have relative noise immunity. Preferably, it should not depend on amplitude data from the receiver, thus being immune from errors caused by receiver saturation. The interface of a device implementing such a technique with the receiver should be relatively simple and such a device should be relatively simple to operate. Finally, the technique should not be dependent upon receiver bandpass characteristics or long term stability and should provide a jammer set-on capability. It is thus a primary object of this invention to provide an improved technique for detecting the carrier or RF frequency of a repetitive pulse signal.

A more specific object of this invention is to provide a technique which permits the detected frequency to be characterized with greater selectivity than that of the receiver and sensor equipment being utilized.

Another object of this invention is to provide a technique of the type indicated above which is relatively simple and inexpensive to implement and relatively easy to connect and operate.

A further object of this invention is to provide a frequency detecting technique of the type indicated above which has relative immunity to operational noise levels and the operation of which is not degraded by receiver saturation.

A still further object of this invention is to provide a frequency detector of the type indicated above with jammer set-on capability which is not dependent upon receiver bandpass characteristics or long term stability.

In accordance with these objects this invention provides a technique for detecting the frequency of a repetitive pulse signal with greater selectivity than that of the sensor used. The technique involves the sweeping of the sensor through a selected frequency band and the generating of a histogram of the frequency distribution of pulses detected by the sensor during the sweep. A plurality of sweeps may be required in order to generate the histogram. The histogram is generated by dividing the selected frequency band into a plurality of frequency cells and by counting the number of pulses detected by the sensor in each of the frequency cells as the sensor is swept through the frequency band. When a predetermined pulse quantity condition, such as the count of pulses for a given frequency cell reaching a predetermined value, is detected, an indication is generated of the upper and lower frequency cells in the selected frequency band in which a number of pulses exceeding a predetermined threshold were detected. The upper and lower frequency indications are then utilized to determine the carrier frequency. The carrier frequency may, for example, be determined by computing the mean of said upper and lower frequency indications.

The foregoing and other objects, features and advantages of the invention will be apparent from the following and more particular description of a preferred embodiment of the invention as illustrated in the accompanying drawings.

In the drawings:

FIG. 1A, 1B and 1C illustrate the basic operation of the invention.

FIGS. 2A and 2B, when combined, form a schematic block diagram of a preferred embodiment of the invention.

FIG. 3 is a diagram illustrating signals appearing at selected points in the circuit of FIG. 2A.

GENERAL DESCRIPTION

For purposes of describing the invention, it will be assumed in the discussion to follow that the input is from a tunable bandpass filter such as a YIG-tuned crystal video receiving system. The basic operation of such a system and its inherent frequency resolution limitation are illustrated in FIG. 1. Referring to line A of this figure, it is seen that since the selectivity of the receiver is not perfect, the filter has a bandwidth BW half of which is on either side of the center frequency $f_{YIG}$ which the filter is at the moment tuned to. This bandwidth is swept repeatedly from the low end frequency range to the high end. A signal at frequency $f_s$ will first be detected as shown on line A of FIG. 1 when the leading edge of the YIG passband reaches $f_s$. Stated another way, the signal will first be detected when the YIG center frequency $f_{YIG}$ is half the YIG bandwidth below $f_s$ or;

$$f_{YIG} = f_s - (BW/2) \qquad (1)$$

As shown on line B of FIG. 1, the signal will continue to be received until the other edge of the pass band moves to $f_s$ so that:

$$f_{YIG} = f_s + (BW/2) \qquad (2)$$

Thus the signal at $f_s$ can be received when the YIG center frequency $f_{YIG}$ is:

$$f_s - (BW/2) \quad f_{YIG} \quad f_s + (BW/2) \qquad (3)$$

as illustrated on line C of FIG. 1.

If line C is thought of as a trace on a panoramic indicator CRT, then it is apparent that a signal of frequency $f_s$ could be displayed anywhere in the shaded area 8. This area will be referred to as the selectivity pass band of the filter. Just where a given received pulse is displayed is a function of the relative phasing of the emitter pulse repetition frequency (PRF) and the receiver sweep. Thus, if a receiver is used having a lack of correlation of the PRF and the start of the tuning sweep, the relative phasing is random. Under these conditions, after several tuning sweeps, the received pulses (or hits) will be more or less uniformly distributed across the filter selectivity pass band (shaded region) 8.

It is also apparent that the true frequency of the signal $f_s$ is located at the center of the selectivity pass band. Therefore, if a record of the distribution of hits is made, it is possible to determine the emitter frequency simply by determining the center of the recorded hits. By use of this technique, the invention permits a frequency determination to be made within any desired degree of selectivity while using receiver and sensor equipment having a relatively large selectivity pass band 8.

In implementing the above, a histogram technique is utilized. A histogram is generated by first dividing the frequency range being investigated into a plurality of frequency cells. Referring again to line C of FIG. 1, assume that it is initially known that the signal $f_s$ is somewhere in the frequency range between $f_0$ and $f_{20}$. This range is divided into 20 equal frequency cells as shown in the figure. As the filter is swept repetatively through this frequency range, a count is maintained of the number of times that a pulse is received when $f_{YIG}$ of the filter is in a particular one of the frequency cells. When a predetermined number of pulses has been counted, a determination is made as to the lowest and highest frequency cells which have a number of hits exceeding a predetermined threshold. The desired frequency is computed from the mean of these two cells. For example, with a filter having the selectivity shown on line C of FIG. 1, the first hits would be detected in cell 7 and the last hits in cell 13. The mean of these two cells is cell 10 the center frequency of which is less than $f_s$ by substantially less than half a cell width. Since the upper boundary occurs close to the junction between cells 13 and 14, it is possible that a number of hits exceeding a selected threshold may occur in cell 14. Under these conditions the mean cell would be 10½ in which case the desired frequency would be the frequency $f_{10}$ at the junction between cells 10 and 11. This frequency is greater than $f_s$ by an amount less than half a cell width. It has been found that the technique of this invention can always provide a frequency determination which is to within half a cell width.

From the above, it is therefore apparent that the number of cells and the width of each cell is a function of the frequency range and frequency resolution required. For example, with twenty cells, each of 5-MHz width, a frequency range of 100 MHz with a frequency resolution of 2.5 MHz (one-half a cell width) is obtained. This resolution can be decreased to any desired value by reducing the width of each cell to twice the desired resolution and increasing the number of cells so as to obtain the desired frequency range.

A decision must also be made as to the number of hits which are required in a frequency cell before the histogram is considered complete and an analysis of the histogram commences. This decision will also influence the threshold number of hits which is required before a cell is accepted as being one of the boundaries of the filter's selectivity pass band. This latter determination will control the amount of noise immunity which the system has. The decision as to when the histogram is considered complete involves a trade-off between the degree of error which can be tolerated and the desired time to obtain the complete histogram. Analysis has indicated that with a maximum of seven hits per cell, the frequency may be determined with a root mean square (RMS) frequency error of less than 2 MHz. This error is reduced to less than 1 MHz if the maximum number of hits per cell is increased to 15. Further increases in the number of hits per cells does not significantly reduce this error. For purposes of the following discussion, it will be assumed that the maximum number of hits per cell is seven, and that for a cell to be selected as a boundary cell, at least two hits are required.

DETAILED CIRCUIT DESCRIPTION

Referring now to FIG. 2A, a receiver system 9 is provided. This system includes a tuning voltage ramp source 10, the output from which is applied through line 12 to control the pass band of tuned bandpass circuit 14. This circuit may, for example, be a YIG filter. The input to circuit 14 is a received signal on line 15 from another portion of the receiver (not shown). The tuning voltage on line 12 is illustrated on line A of FIG. 3. For reasons which will be discussed later, source 10 is asynchronously triggered by pulses from random pulse source 13.

For purposes of the present discussion it will be assumed that the frequency range covered by the tuning signal is several times greater than the frequency range for which a histogram is to be formed. The operator is therefore assumed to have some initial knowledge as to the signal he is looking for. In order to control the frequency band of the histogram, the tuning voltage on line 12, in addition to being applied to control circuit 14, is also applied as one input to adder 16. The other input to adder 16 is a controlled negative voltage level from source 18 which is applied through variable resistor 20. This voltage, which is referred to as the expanded trace control voltage, may be derived from receiver system 9. The output from adder 16 on line 22 is referred to as the window voltage. This signal is applied as one input to each of a plurality of voltage comparison circuits 24A-24T, the number of these voltage comparison circuits being one greater than the number of frequency cells being utilized. The other input to each of these voltage comparators is a voltage which corresponds to the frequency at the leading edge of the corresponding frequency cell. Thus, $V_0$ is the window voltage which corresponds to frequency $f_0$, (FIG. 1) $V_1$ the window voltage which corresponds to frequency $f_1$ and so on. $V_{20}$ corresponds to a frequency value $f_{20}$ and, as may be seen from line A of FIG. 3, is significantly less than the peak value of the tuning voltage. Thus, if the expanded trace control voltage applied to adder 16 from source 18 is 0, the histogram is formed at the lower frequency end of the frequency band scanned by the receiver. The bandwidth of interest for the histogram may be moved up the frequency scale by decreasing the resistance of resistor 20 and thus increasing the negative voltage applied to adder 16. For example, with a negative voltage of $-V_i$ as shown on line A of FIG. 3, the resulting window voltage on line 22 would be as shown on line B of FIG. 3, and the histogram would be taken of a frequency band near the center of the received band.

An output on a line 26 from a compare circuit 24 indicates that the window voltage on line 22 is greater than the reference voltage applied to the compare circuit's other input. Each of the lines 26 except the line 26T is connected as one input to a corresponding NAND gate 28 and each line 26 except line 26A is also connected through an inverter 30 and line 31 to one input of the NAND gate 28 for the preceeding stage. A third input to each of the NAND gates 28 is an output line 32 from a corresponding NAND gate 34. As will be seen shortly, the line 32 serves to prevent an overflow condition from developing in any of the histogram counters. The final input to each of the NAND gates 28 is output line 36 from NOR gate 38.

In operation, reset switch 40 (FIG. 2B) is initially closed permitting a negative voltage to be applied to decondition NAND gate 41. The resulting positive output on line 43 is utilized as a reset signal to be applied to all counters and flip-flops in the circuit. Switches 42 and 44 are then set to their emitter position. Switch 42 being in its emitter position causes a positive voltage to be applied through line 46 to one input of NAND gate 48. Since flip-flop 50 is reset by the closing of the switch 40, there is no signal on the flip-flop output line 52 and inverter 54 thus generates an output on line 56 which is applied as a second input to NAND gate 48. When a pulse is detected by receiver 14, a signal appears on line 58 to trigger one shot 60. The resulting pulse of short duration on line 62 fully conditions NAND gate 48 to generate a negative output pulse on line 64 which is passed through NOR gate 38 to appear as a positive pulse on line 36.

At the time that a pulse appears on line 36, there will be no more than one NAND gate 28 having positive inputs on both the line 26 and the line 31 which are connected to it. This NAND gate will thus be fully conditioned to generate a negative output pulse on its line 66 which pulse is applied to increment the corresponding four-stage counter 68. Thus, if the window voltage at the time that a pulse appears on line 36 is greater than $V_1$ but less than $V_2$, positive voltages will appear on lines 26A and 26B but not on 26C. The negative voltage on line 26C will cause a positive voltage on line 31C which fully conditions NOR gate 28B to increment the count in counter 68B. One shot 60 triggers on the leading edge of a received pulse on line 68 and thus assures that a relatively wide received pulse occurring near the transition between two cells will not be counted twice.

The above described sequence of operations is repeated with each received pulse being counted by the appropriate cell counter until the end of the tuning voltage ramp is reached. When the tuning ramp returns to 0, the resulting transition energizes trigger 70 resulting in an output on line 72 which momentarily energizes one shot 74. The resulting pulse on line 75 is applied to the set input of flip-flop 50. However, flip-flop 50 will be set at this time only if a positive enable signal also appears on output line 76 from NAND gate 78. The inputs to NAND gate 78 are output lines 32 from NAND gates 34. The inputs to each NAND gate 34 are the four output lines from the stages of the corresponding counter 68. Thus, there will be a positive output from a NAND gate 34 until the corresponding counter stage is full. So long as none of the counter stages are full, NAND gate 78 remains fully conditioned generating a negative signal on set enable line 76 to inhibit the setting of flip-flop 50. It should at this point be mentioned that, while a single NAND gate 78 has been shown in the figure, because of limitations on existing hardware, several NAND gates may have to be combined in order to accommodate the required 20 inputs.

As was indicated previously, it is desirable that the relative phasing between the start of the tuning sweep and the PRF of the detected signal be made random. This is accomplished by energizing ramp source 10 in receiver system 9 from random pulse generator 13. The phasing of the tuning voltage will thus be random, permitting the hit distribution to be relatively uniform over the selectivity pass band 8 of the filter. After one or more sweeps by the tuning voltage, a time will come when a count of seven is accumulated in at least one of the counters 68, fully conditioning the associated NAND gate 34 to generate a negative output on the corresponding line 32. This negative output is applied to decondition the corresponding NAND gate 28 preventing the counter from overflowing, and is also applied to decondition NAND gate 78 resulting in a positive output on line 76 which is applied to enable the setting of flip-flop 50. At the end of the sweep when one of the counters 68 is filled, one shot 74 will again generate an output which is now effective to set flip-flop 50.

Flip-flop 50 being set results in a positive output on line 52 which is applied through inverter 54 to decondition NAND gate 48, thus preventing further incrementing of counters 68 while their contents are being analyzed. The positive output on line 52 is also applied as one input to NAND gates 80 and 82. A second input to each of these NAND gates is output line 84 from scan clock 86. As will be seen shortly, positive signals initially appear on both line 88, which is the third input to NAND gate 80, and line 90, which is the third input to NAND gate 82. Thus, when flip-flop 52 is set, each clock pulse on line 84 from clock 86 fully conditions both NAND gate 80 and NAND gate 82 to generate negative pulses on lines 92 and 94 respectively. The signal on line 92 is applied to decrement five-stage down-counter 96 while the signal on line 94 is applied to increment four-stage up-counter 98. These counters are initially set so that counter 96 indicates cell 20 while counter 98 indicates cell one. The count in counter 96 is applied through lines 100 to decoder 102. Decoder 102 generates an output on a separate line 104 for each possible count on counter 96. Thus, when there is a count of 20 in counter 96, decoder 102 generates an output on line 104A. A count of 19 in the counter causes an output on line 104B and so on. Since it is assumed that the upper cell for the selectivity pass band 8 will not be less than 4, decoder 102 only has 16 outputs. Each line 104 is connected as one input to a corresponding NAND gate 106 the other input to which is an output line 108 from an inverter 110 for the corresponding frequency cell. The input to each inverter 110 is an output line 112 from a corresponding NOR gate 114. The inputs to each of the NOR gates 114 are the three most significant output lines from the corresponding counter 68. Thus, there will be a negative output from a NOR gate 114 on a line 112 if the count in the corresponding counter 68 is equal to or greater than 2. This negative output is converted by inverter 110 into a positive signal on line 108. Thus, a NAND gate 106 is fully conditioned to generate an output signal on its corresponding output line 116 if, when it is sampled by decoder 102, it is found that the counter 68 for the corresponding frequency cell has a count of at least two in it.

Lines 116 are connected as the inputs to NAND gate 118. While single NAND gate 118 has been shown in the figure, because of the number of inputs involved more than one gate may actually be employed. So long as none of the NAND gates 106 are fully conditioned, all of the inputs to NAND gate 118 are positive resulting in a negative output on line 120 which is inverted by inverter 122 to cause a positive signal on line 88. However, when one of the NAND gates 104 is fully conditioned, the resulting negative input to NAND gate 118 deconditions this gate resulting in a positive signal on line 120 which is inverted to provide a negative signal on line 88. This signal deconditions NAND gate 80 preventing further decrementing of counter 96. An indication of the highest frequency cell in which at least two hits were detected is thus stored in counter 96.

Similarly, the count in four-stage up-counter 98 is passed through lines 124 to decoder 126. For each possible count in counter 98, there is a corresponding output line 128 from the decoder. Again, there are only 16 output lines from the decoder corresponding to cells 1–16, it being assumed that the lower edge of selectivity pass band 8 (line C, FIG. 1) does not occur beyond cell 16. Each line 128 is connected as one input to a corresponding NAND gate 130 the other input to each of these NAND gates being a line 108 from the counter 68 for the corresponding frequency cell. Thus, a NAND gate 130 is fully conditioned to generate a negative output on its output line 132 when it is scanned by decoder 126 and an indication is received that the counter 68 for the corresponding frequency cell has a count of at least two in it. The lines 132 are connected as inputs to NAND gate 134. So long as all of the inputs to this NAND gate are positive, the gate generates a negative output on line 136 which is converted by inverter 138 into a positive signal on line 90. However, when one of the NAND gates 130 is fully conditioned, the resulting negative signal on a line 132 deconditions NAND gate 134 resulting in a negative signal on line 90 which deconditions NAND gate 82 preventing further incrementing of up-counter 98. An indication of the cell forming the lower boundary of selectivity pass band 8 is thus stored in counter 98.

The counts which are stored in down-counter 96 and up-counter 98 are applied through lines 100 and 124 respectively to adder and divider circuit 142. This circuit forms the sum of the counts in these two counters. By utilizing the five most significant bits of this sum as the frequency cell address and the least significant bit of the sum as a fraction indication, the computed sum is effectively divided by 2 providing the desired mean cell value. The mean cell value on output line 144 from adder 142 is applied to the input of six-stage memory register 146. The positive signals on lines 120 and 136 when the desired upper and lower cell positions have been located fully conditions NAND gate 148 to generate a negative signal on line 150. This negative signal is applied as one input to NOR gate 152. The other input to this NOR gate is from switch 44. Since this switch is in the emitter position at this time, a ground potential appears on line 154. Thus, when a negative signal appears on line 150, NOR gate 152 generates a positive output on line 156 which is delayed slightly in delay 158 to permit the arithmetic operations in adder 142 to be completed, and is then applied to energize one shot 160. The resulting output pulse on line 162 enables memory register 146 to store the desired mean cell value.

The information stored in register 146 may be utilized for any desired purpose, such as to cause a visual display, a print out, or the like. In the embodiment shown in FIG. 2B, it is assumed that the window voltage is utilized to control the trace on a cathode ray tube screen. The signal on line 144 is applied through a digital-to-analogue converter 164 to a tolerance generator 166. The resulting outputs on lines 168 and 170 are respectively a voltage which corresponds to the window voltage for the frequency which has been determined to be the frequency of the detected signal plus a predetermined small value and a voltage which is the window voltage for the detected frequency minus the predetermined small value. The signals on lines 168 and 170 are applied to voltage comparison circuits 172 and 174 the other input to each of which is the window voltage line 22. A positive output appears on line 176 from comparitor 172 when the window voltage is less than the voltage on line 168 while a positive voltage appears on output line 178 from comparitor 174 when the window voltage is greater than the voltage appearing on line 170. Thus, when the window voltage is within the tolerance band, NAND gate 180 is fully conditioned to generate a negative output signal on line 182. This negative voltage causes a momentary blanking of the CRT beam to visually indicate the point in the frequency band indicated by the window voltage at which the input signal has been determined to occur.

One of the advantages of the invention described above is that the same circuit may be utilized both to detect the frequency of the unknown input signal and to tune a jammer to neutralize this signal. Since the same circuitry is being used both for detection and tuning, any errors introduced by the circuit will be cancelled. This also means that jammer set-on is not dependent upon the receiver bandpass characteristics or long term stability.

In operation, after the frequency determination has been made, the operator transfers switches 42 and 44 to the jammer position. He then closes reset switch 40 to reset all of the counters and flip-flops in the circuit. However, it should be noted that the reset signal is not effective to reset memory regisitor 146. The operator then turns on the jammer and starts to tune it. The signal generated by the jammer will be picked up by receiver 9 causing an output to appear on line 58. However, since the jammer signal is continuous rather than pulsed, this results in a continuous positive level on line 58 when the receiver is tuned to the frequency of the jammer. In order to permit counting to occur as the window voltage on line 22 passes through the jammer frequency, clock pulses are applied through line 186 to NAND gate 188. Thus, the inputs to NAND gate 188 are a positive level from switch 42 on line 190, a positive level from inverter 54 on line 56, a positive level on line 58 when the window voltage is in the selectivity pass band 8 for the jammer frequency, and a series of positive clock pulses on line 186. Each clock pulse, therefore, fully conditions gate 188 to generate a negative output pulse on line 192. These negative pulses result in positive pulses on line 36 which are counted in the manner previously described. The pulse repetition rate of the clocks on line 186 are such that at least one of the counter stages 68 will be filled during a single sweep of tuning voltage source 10. Flip-flop 50 is thus set at the end of the tuning voltage sweep permitting the frequency of the jammer to be determined in a manner previously described. The resulting digital value for the mean frequency cell position on line 144 is compared in six-bit comparitor 200 with the mean frequency cell position for the detected signal in register 146. A successful comparison in circuit 200 results in a positive output on line 202 which, in conjunction with the positive output from flip-flop 50 on line 52 fully conditions NAND gate 204 to generate a negative signal on line 206. This signal is applied to trigger one shot 208. The resulting pulse on line 210 is inverted by an inverter 212 and applied to turn on verification lamp 214. The duration of one shot 208 is just greater than the sweep time of the tuning voltage ramp so that lamp 214 will remain on continuously so long as the jammer is tuned to the desired frequency.

As indicated previously, at the end of each tuning voltage ramp, one shot 74 generates a pulse on line 75. This pulse is delayed in circuit 216 to permit sufficient time for the comparison in circuit 200 to be completed and for one shot 208 to be energized and is then applied as a positive input through line 218 to one input of NAND gate 220. The outer input to this gate is line 154 which has a positive voltage on it at this time from switch 44. The resulting negative signal on line 222 deconditions NAND gate 41 causing a positive reset signal to be generated. The circuit is thus ready to redetect the frequency of the jammer signal.

It is thus apparent that the operator may continue to adjust the tuning on the jammer signal until he sees that verification lamp 214 is on. If he tunes beyond the point where the verification lamp is on, the lamp will be extinguished. The operator is thus provided with an extremely simple means for tuning the jammer to the required frequency for the received input pulses.

A technique has thus been provided which permits an unknown frequency to be detected with many times greater accuracy than the selectivity of the tuning filter utilized, and is susceptible of implementation with relatively simple and inexpensive equipment. By increasing the number of hits which are required before a frequency cell is recognized as a border cell, a desired degree of noise immunity may be achieved. Since the technique is totally independent of the amplitude of received pulses, the effectiveness of the technique cannot be degraded by receiver saturation.

While in the preferred embodiment of the invention illustrated in FIGS. 2A and 2B, special purpose circuitry has been utilized throughout, suitably programmed general purpose equipment may be utilized either to perform the arithmetic operations after the histogram has been formed, or to perform the total operation. It is also apparent that other equivalent logical elements could be utilized in place of the various elements shown in the figures. Further, while a mean frequency is computed in the preferred embodiment of the invention from the boundary cell values, the histogram information may be used in other ways to determine the unknown frequency. For example, a median rather than a mean value may be used, or the number of of hits could be counted starting at the two boundary cells, with the desired cell position being that at which the two counts are equal. More sophisticated statistical techniques might also be employed. Another possible modification involves the manner in which a decision is made as to when the forming of the histogram is complete. While the filling of the counter for at least one histogram cell provides a better noise immunity ratio, the histogram could be considered complete when a predetermined number of tuning ramp sweeps have been completed or after a predetermined period of time. Other pulse quantity conditions, such as the total number of pulses counted reaching a predetermined value could also be utilized as an indication that the histogram is complete. Finally, in some applications, an externally generated control signal might be utilized to terminate the histogram generating function.

Thus, while the invention has been particularly shown and described with reference to a preferred embodiment thereof, it will be understood by those skilled in the art that the foregoing and other changes in form and details may be made therein without departing from the spirit and scope of the invention.

What is claimed is:

1. A circuit for detecting the frequency of a repetitive pulse signal with greater selectivity than that of the sensor used comprising:

means for sweeping said sensor through a selected frequency band;

means for generating a histogram of the frequency distribution of pulses detected by said sensor during said sweep;

means for detecting a predetermined histogram complete condition;

means operative in response to said detecting means for generating from said histogram an indication of the upper and lower frequencies in said selected frequency band in which a number of pulses exceeding a predetermined threshold were detected; and means for utilizing said upper and lower frequency indications to determine said frequency.

2. A circuit of the type described in claim 1 wherein said histogram complete condition is a predetermined pulse quantity condition in said histogram.

3. A circuit of the type described in claim 1 wherein said frequency determining means determines said frequency by computing the mean of said upper and lower frequency indications.

4. A circuit of the type described in claim 2 wherein said sensor sweeping means is repetitively operative.

5. A circuit of the type described in claim 4 including means for randomly jittering the start, and therefore the phase, of the sweeps of said sensor sweeping means.

6. A circuit of the type described in claim 4 wherein said selected frequency band is divided into a plurality of frequency cells;

wherein said histogram generating means includes means for counting the number of pulses detected by said sensor in each of said frequency cells as it is swept through said frequency band.

7. A circuit of the type described in claim 6 including means for causing said counting means to be triggered on the leading edge of each pulse whereby a single pulse cannot be counting as occurring in two different frequency cells.

8. A circuit of the type described in claim 6 wherein said predetermined pulse quantity condition is the pulse count for at least one of said cells reaching a predetermined value.

9. A circuit of the type described in claim 8 wherein said predetermined value is the maximum value which may be stored in the counter means for said cell; and
including means for indicating that a counter means for a cell is full, and means responsive to said indicating means for inhibiting further incrementing of said counter means.

10. A circuit of the type described in claim 8 including means for inhibiting said upper and lower frequency generating means from operating until the end of the sensor sweep during which the pulse count for at least one of said cells reaches said predetermined value.

11. A circuit of the type described in claim 6 wherein said upper and lower frequency indication generating means includes means for indicating the upper frequency cell for which said counting means has counted a number of pulses exceeding a predetermined threshold, and means for indicating the lowest frequency cell for which said counting means has counted a number of pulses exceeding a predetermined threshold.

12. A circuit of the type described in claim 11 wherein said upper frequency cell indicating means includes a down-counter which is initially reset to indicate the highest frequency cell, means operative when said predetermined pulse quantity condition is detected for decrementing said down-counter, means for testing the pulse count for the cell indicated by said down-counter to determine if it exceeds said predetermined threshold, and means operative when the pulse count for the cell indicated by said down-counter exceeds said threshold for inhibiting further decrementing of said down-counter, whereby an indication of said upper frequency cell is stored; and
wherein said lower frequency cell indicating means includes an up-counter which is initially reset to indicate the bottom frequency cell, means operative when said predetermined pulse quantity condition is detected for incrementing said up-counter, means for testing the pulse count for the cell indicated by said up-counter to determine if it exceeds said predetermined threshold, and means operative when the pulse count for the cell indicated by said up-counter exceeds said threshold for inhibiting further incrementing of said up-counter, whereby an indication of said lower frequency cell is stored.

13. A circuit of the type described in claim 11 wherein said frequency determining means includes means for computing the sum of the indicated upper and lower frequency cells; and
means for storing a value equal to half of said sum as an indication of said frequency.

14. A circuit of the type described in claim 1 including means for utilizing said indication of determined frequency to generate a display control signal.

15. A circuit of the type described in claim 1 wherein the tuning frequency range of said sensor covers a predetermined frequency band; and
wherein said selected frequency band is less than said predetermined frequency band.

16. A circuit of the type described in claim 15 wherein said sensor sweeping means includes means for generating a tuning voltage ramp, means for generating a DC expended range control voltage, and means for combining said voltages to obtain a window control voltage for said selected frequency band.

17. A circuit of the type described in claim 1 including means for setting said circuit to detect the frequency of a generated jammer signal;
means for comparing the detected jammer frequency with the frequency determined by said frequency determining means; and
means for indicating when said compared frequency are equal.

18. A circuit of the type described in claim 17 wherein said circuit setting means includes means for clocking said jammer signal at a rate such that said histogram is formed during one sweep of said sensor sweeping means; and
means operative after said comparing means for resetting said circuit whereby a new histogram may be formed during the next sweep of said sensor sweeping means.

19. A method for detecting the frequency of a repetitive pulse signal with greater selectivity than that of the sensor used comprising the steps of::
sweeping said sensor through a selected frequency band;
generating a histogram of the frequency distribution of pulses detected by said sensor during said sweep;
detecting a predetermined histogram complete condition;
generating from said histogram, when said predetermined histogram complete condition is detected, an indication of the upper and lower frequencies in said selected frequency band in which a number of pulses exceeding a predetermined threshold were detected; and
utilizing said upper and lower frequency indications to determine said frequency.

20. A method of the type described in claim 19 wherein said histogram complete condition is a predetermined pulse quantity condition in said histogram.

21. A method of the type described in claim 19 wherein said frequency is determined from the mean of said upper and lower frequency indications.

22. A method of the type described in claim 20 wherein said sensor is swept repetitively through said selected frequency band.

23. A method of the type described in claim 22 wherein the start, and therefore the phase, of the sensor sweeps are randomly jittered.

24. A method of the type described in claim 22 wherein said histogram generating step includes the steps of dividing said selected frequency band into a plurality of frequency cells, and counting the number of pulses detected by said sensor in each of said frequency cells as it is swept through said frequency band.

25. A method of the type described in claim 24 wherein said predetermined pulse quantity condition is the pulse count for at least one of said cells reaching a predetermined value.

26. A method of the type described in claim 24 wherein said upper and lower frequency indications are indications of the upper and lower frequency cells for which a number of pulses exceeding said predetermined threshold were counted.

27. A method of the type described in claim 26 wherein said frequency determining step includes the steps of computing the sum of the indicated upper and lower frequency cells, and storing a value equal to half of said sum as an indication of said frequency.

28. A method of the type described in claim 19 wherein the tuning frequency range of said sensor covers a predetermined frequency band; and
wherein said selected frequency band is less than said predetermined frequency band.

29. A method of the type described in claim 19 including the steps of utilizing said frequency detecting method to detect the frequency of a generated jammer signal;
comparing the detected jammer frequency with the frequency previously determined by said frequency detecting method; and
indicating when said compared frequency are equal.

* * * * *